(No Model.)
N. EDWARDS.
ATTACHMENT FOR BRIDLES.
No. 393,695. Patented Nov. 27, 1888.
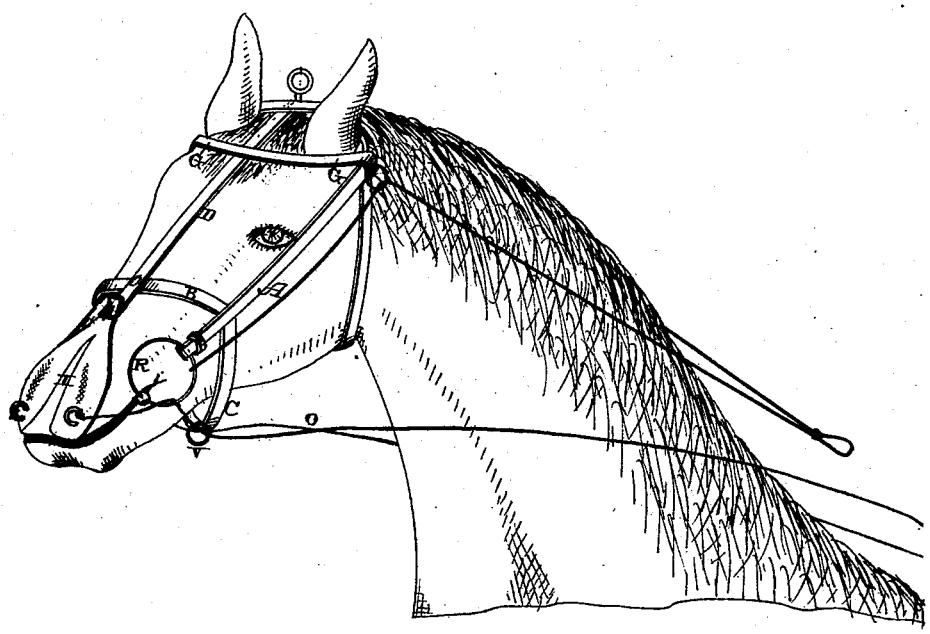
Witnesses.
L. F. Gardner
Allen J. Pattison
Inventor
N. Edwards,
per F. A. Lehmann,
Atty.

UNITED STATES PATENT OFFICE.

NATHANIEL EDWARDS, OF WASHINGTON COURT-HOUSE, OHIO.

ATTACHMENT FOR BRIDLES.

SPECIFICATION forming part of Letters Patent No. 393,695, dated November 27, 1888.

Application filed May 29, 1888. Serial No. 275,525. (No model.)

*To all whom it may concern:*

Be it known that I, NATHANIEL EDWARDS, of Washington Court-House, in the county of Fayette and State of Ohio, have invented certain new and useful Improvements in Attachments for Bridles; and I do hereby declare the following to be a full, clear, and exact description of the invention, such as will enable others skilled in the art to which it pertains to make and use it, reference being had to the accompanying drawing, which forms part of this specification.

My invention relates to an improvement in attachments for bridles; and the object of my invention is to attach to a bridle a pad or other device which is operated by the reins, and which pad can be made to close over the horse's nostrils, so as to shut off his breath whenever he acts viciously, and thus subdue him without inflicting any pain or suffering.

The accompanying drawing represents a perspective of a bridle to which my invention is applied.

A represents a bridle, of any suitable construction, provided with the nose-piece B and the chin-piece C. Buckled to the strap which passes back of the ears and over the top of the head is a strap, D, which extends down along the center of the horse's face, passing under the front band, G, and which strap D is fastened to the nose-piece. This strap serves to support the nose-piece B against any pull which may be exerted against it. Fastened adjustably to the nose-piece is the pad I, of any suitable shape or material which will answer the purpose, and which can be adjusted upon the nose-piece so as to just fit the nose of the animal to which it is to be applied. To the lower corners of this part I, which is so shaped at its lower end as to fit over the nostrils of the horse, are fastened the reins O, which may either pass back through the rings R of the bridle, crossing under the jaw, or which may extend backward through the ring V on the chin-piece to the driver or rider.

Whenever the horse begins to act viciously a pull upon the reins causes the pad I to close tightly over the nostrils and shut off his wind, thus compelling him to submit, and that without the necessity of punishing him in any other manner. As long as the animal's breath is shut off he will be unable to kick or become unmanageable in any manner, and hence with this attachment the most vicious animal can be quickly subdued.

Having thus described my invention, I claim—

The combination of the bridle, having the nose-piece B and chin-piece C, with the strap D, which is secured to the crown-piece at its upper end and to the nose-piece at its lower end, the pad I, for closing over the nostrils of the animal and which is secured to the lower end of the strap D, the reins O, secured to the lower corners of the pad, and the ring V, substantially as shown and described.

In testimony whereof I affix my signature in presence of two witnesses.

NATHANIEL EDWARDS.

Witnesses:
   ADD BURNETT,
   E. A. RAMSAY.